(12) United States Patent
Burg et al.

(10) Patent No.: US 7,350,144 B2
(45) Date of Patent: Mar. 25, 2008

(54) ORGANIZATIONAL VISUALIZATION SYSTEM

(75) Inventors: Bernard Joseph Burg, Menlo Park, CA (US); Craig Peter Sayers, Menlo Park, CA (US)

(73) Assignee: Hewlett-Packard Development Copmpany, L.P., Houston, TX (US)

( * ) Notice: Subject to any disclaimer, the term of this patent is extended or adjusted under 35 U.S.C. 154(b) by 895 days.

(21) Appl. No.: 10/418,835

(22) Filed: Apr. 17, 2003

(65) Prior Publication Data

US 2004/0210827 A1    Oct. 21, 2004

(51) Int. Cl.
G06F 15/00 (2006.01)
G06F 17/00 (2006.01)

(52) U.S. Cl. .................. 715/526; 715/500; 715/848; 715/9

(58) Field of Classification Search ................ 715/526, 715/848, 853, 500; 705/9
See application file for complete search history.

(56) References Cited

U.S. PATENT DOCUMENTS

| 5,855,006 | A  | * | 12/1998 | Huemoeller et al. ........... 705/9 |
| 6,088,032 | A  | * | 7/2000  | Mackinlay .................. 715/848 |
| 6,243,093 | B1 | * | 6/2001  | Czerwinski et al. ........ 715/848 |
| 6,243,724 | B1 | * | 6/2001  | Mander et al. ............. 715/526 |
| 6,369,840 | B1 | * | 4/2002  | Barnett et al. ............. 715/853 |
| 6,582,474 | B2 | * | 6/2003  | LaMarca et al. ............ 715/500 |

* cited by examiner

*Primary Examiner*—William Bashore

(57) ABSTRACT

An organizational visualization system is provided including obtaining organization information, obtaining overlay information, and processing the organization information and the overlay information to provide a visualization of the overlay information on an organization.

4 Claims, 5 Drawing Sheets

ORGANIZATIONAL VISUALIZATION SYSTEM

BACKGROUND

1. Technical Field

The present disclosure relates generally to organization charts and more specifically to the visualization of organizational structures.

2. Background Art

Most meetings between people or organizations who are unfamiliar with each other start with an ad hoc presentation of organization charts. These presentations are hand-tailored and generally provide information regarding the organization's hierarchy and the people in the hierarchy. The organization charts are considered to be very valuable information and are often labeled "Company Confidential" to prevent widespread dissemination of the information.

Existing organization chart tools are not connected to work in "active environments". An active environment is one in which people, places, and things are first-class citizens of a connected wired and wireless world where e-services meet the physical world in which humans are mobile, devices and services are federated and context aware, and everything has a web presence.

Since the existing organization charting tools were not conceived to connect to an active environment, these tools cannot dynamically create the minimal organization chart needed in a meeting in which it is desired to position the people attending the meeting inside a context to optimize a discussion. Essentially, these existing organization charting tools are mainly used internally in companies because of the need to restrict dissemination of confidential and/or proprietary information outside the company.

Further, although there are various types of other visual representations than organization charts, such as spreadsheets, databases, or bar charts, these are generally not used with organization charts in a way to structure information to see various types of relationships, which may be critical to understanding the "big picture".

DISCLOSURE OF THE INVENTION

The present invention provides for an organizational visualization system including obtaining organization information, obtaining overlay information, and processing the organization information and the overlay information to provide a visualization of the overlay information on an organization to allow understanding of the "big picture".

Certain embodiments of the invention have other advantages in addition to or in place of those mentioned above. The advantages will become apparent to those skilled in the art from a reading of the following detailed description when taken with reference to the accompanying drawings.

DETAILED DESCRIPTION OF THE INVENTION

Figure 1:
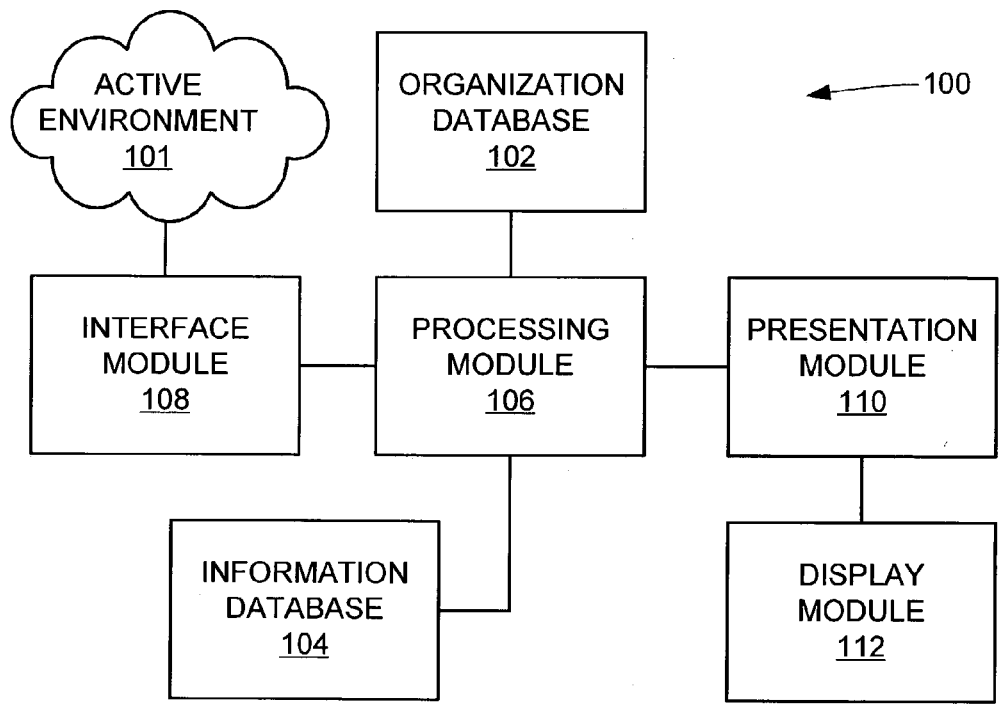
FIG. 1 is a view of an organizational visualization system in accordance with embodiments of the present invention.

Referring now to FIG. 1, therein is shown an organizational visualization system 100 in accordance with embodiments of the present invention.

The organizational visualization system 100 includes an organization database 102 and an information database 104 providing information for computer, central processing unit (CPU), or processor, such as a processing module 106. The processing module 106 may be provided with input from an interface module 108, which interfaces to an "active environment", and provides output to a presentation module 110 for visualization on a display module 112.

An active environment 101 may be defined as one in which people, places, and things are citizens of a connected wired and wireless world where e-services meet the physical world in which humans are mobile, devices and services are federated and context aware, and everything has a web presence. The active environment 101 may include computer agents that act for and represent a user in a web-connected world.

The organization database 102 is provided with information of the type used to form an organization chart, such as the hierarchy of an organization, the titles within the hierarchy, the reporting relationships, and the names of the people and their titles.

The information database 104 is provided with "overlay" information, which can be "overlaid" on the organization chart to provide organization specific information such as for example: meeting information for meetings; sales information for sales meetings; technical information for technical collaborations: etc.

The processing module 106 may perform dynamically generated organization charting by using information from the organization database 102, the information database 104, and the interface module 108.

The interface module 108 interacts with the active environment 101 to obtain active information, which may include current information such as: the name of attendees and meeting details; contact names; project description; etc.

The presentation module 110 takes the processed information from the processing module 106 and formats it for visualization on the display module 112. The display module 112 can be any of a number of display devices ranging from auditorium-size light displays through projection screens, down to personal digital assistants, or even cell phones.

Figure 2:
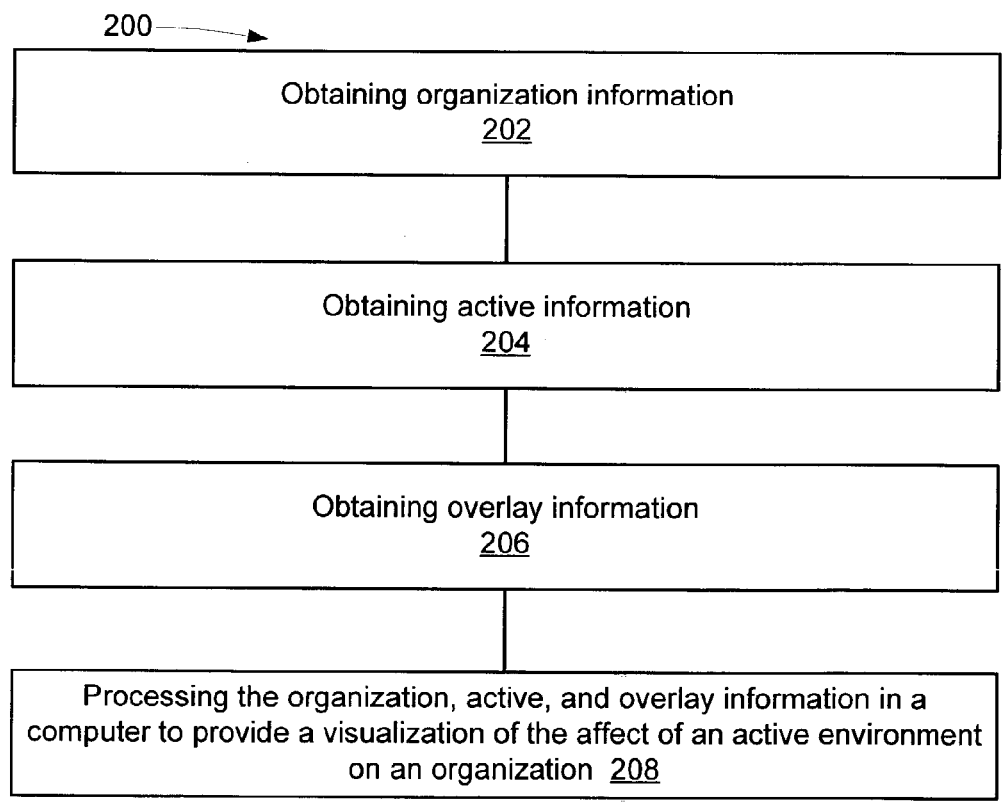
FIG. 2 is a simplified flow chart 200 of the organizational visualization system of FIG. 1 in accordance with embodiments of the present invention.

Referring now to FIG. 2, therein is shown a simplified flow chart 200 of the organizational visualization system of FIG. 1 in accordance with the present invention. The simplified flow chart 200 includes: a step 202 of obtaining organization information; a step 204 of obtaining active information; a step 206 of obtaining overlay information; and a step 208 of processing the organization, active, and overlay information to provide a visualization of the affect of an active environment on an organization.

Figure 3:
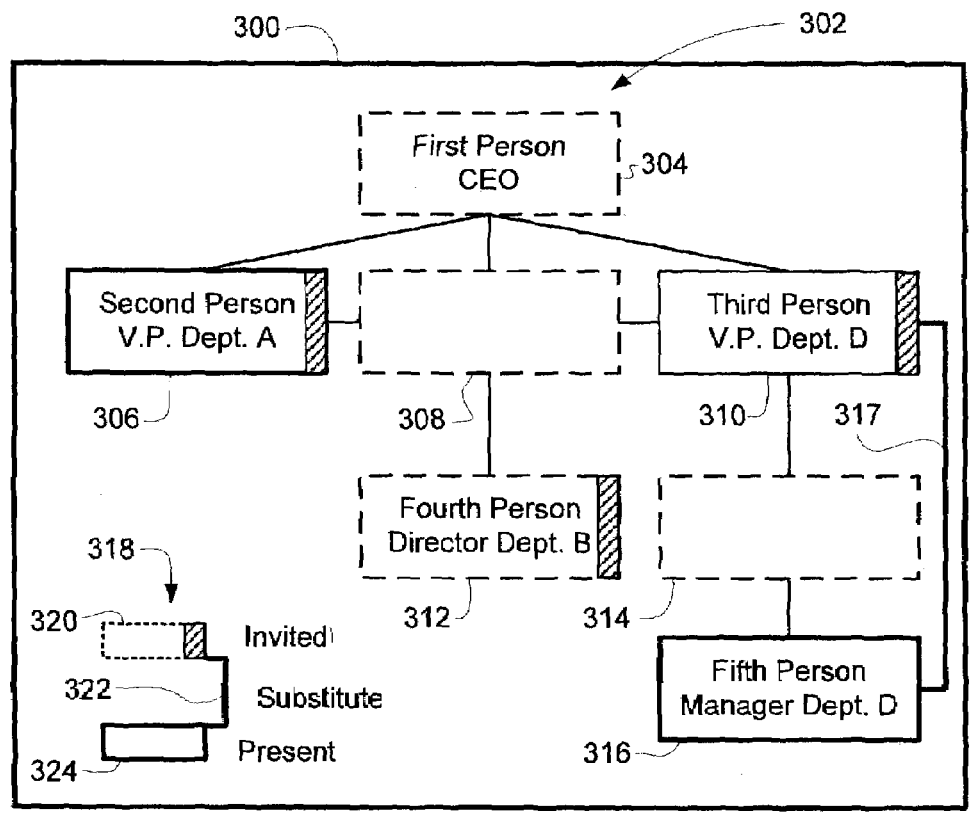
FIG. 3 is an exemplary meeting display of the organizational visualization system of FIG. 1 used as a meeting manager.

Referring now to FIG. 3, therein is shown an exemplary meeting display 300 of the organizational visualization system 100 of FIG. 1 used as a meeting manager.

In some embodiments of the present invention, information on individuals invited and/or present in a meeting is used to dynamically construct an organizational chart for display. Then, information is shown such as: who was invited, but not present; who is present, but not invited; who is local; who is remote; who is currently speaking (on a conference call); etc. The exemplary meeting display 300 is generated automatically on projection equipment in a meeting room.

In some embodiments of the present invention, information from the organization database 102, the information database 104, and the interface module 108 (all shown in FIG. 1) are used in real time to create an organization chart 302. The interface module 108 picks up the name and title from links with personal digital assistants or portable computers as attendees enter a conference room. The organization database 102 uses previously provided hierarchy and title information to create the organization chart 302, which is overlaid with information from the information database 104.

For example, the organization chart 302 starts with a block 304 at a first level in the organization chart 302 to show a First Person, who is the Chief Executive Officer (CEO) of the organization. At a second level is shown a block 306 showing a Second Person, who is Vice President of Department A, a block 308 showing another vice presidential position of Department B, and a block 310 showing a Third Person, who is Vice President of Department B. A third level has a block 312 showing a Fourth Person who is Director of Department B, and a block 314 showing another director-level position of Department B. A fourth level of the organization chart 302 has a block 316 showing a Fifth Person, who is Manager of Department B.

In the above example, information on individuals invited and/or present at the meeting is dynamically constructed on the organization chart 302 by the processing module 106 of FIG. 1. By reference to a legend 318, it may be seen that a partially crosshatched region such as shown by a block 320 indicates an individual who has been invited, such as the Second Person of the block 306. A dotted block with a partially crosshatched region indicates that a person has been invited but has not attended, such as the Fourth Person of the block 312. A bolded block, such shown by as a block 324, may indicate that an individual is present, such as the Second Person of the block 306 and the Fifth Person of the block 316, who was not invited. A bold line, such as shown by a line 322, may indicate that a person is a substitute, such as the Fifth Person of the block 316.

The above gives much richer information, as compared to a set of business cards, since it gives functional structure and at least some of the relations between the people in the meeting. In addition, the visualization on the exemplary meeting display 300 indicates those invited/present at the meeting. Different symbols, colors, and arrangements can be used to provide the visualization. The exemplary meeting display 300 provides "at a glance" identification of departments, for example, where there may be insufficient participation in the meeting.

It will also be understood that it is possible to also add information from the information database 104 of FIG. 1 from the current and previous meetings so as to add such information as: who attended those meetings; action items; written reports; deliverables; etc. The resulting display gives a visualization of the "big picture". In one glance, it is possible to derive information such as: who the regular attendees are; who the decision makers are; who is doing what work; etc.

Different kinds of organizational charts can be visualized: a minimal one for external meetings with other organizations, and fully detailed ones for internal meetings. It often occurs where certain information on structure and procedures within a company needs to be maintained within the company, and the organizational visualization system 100 is flexible enough to accommodate this.

The exemplary meeting display 300 and acquisition of the active information can be realized by existing tools within the current state of the technology as would be evident to those having ordinary skill in the art based on the disclosure herein.

Figure 4:
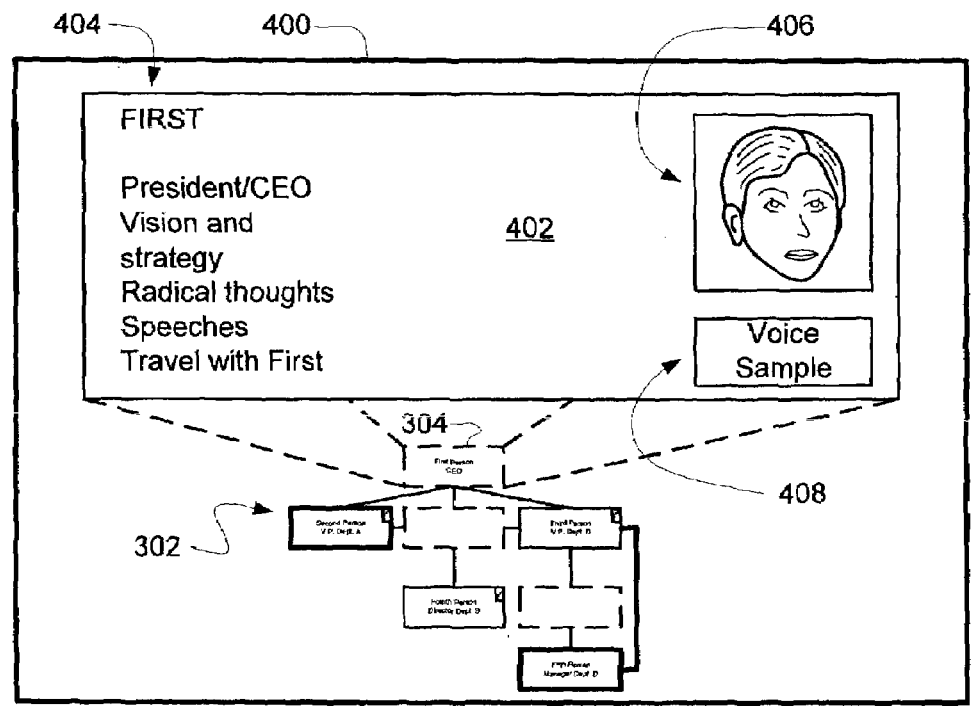
FIG. 4 is an exemplary personal display of the organizational visualization system of FIG. 1 used as a meeting manager.

Referring now to FIG. 4, therein is shown an exemplary personal display 400 of the organizational visualization system 100 of FIG. 1 used as a meeting manager.

The exemplary personal display 400 will replicate the organization chart 302 but be interactive such that various other information may be accessed. For example, by highlighting the block 304, a block 402 will appear with further information 404 about the individual and a photograph 406 of the individual.

Where a telephone conference meeting is being held, a block 408 would provide access to a voice sample to assist in recognizing a telephone speaker.

The above personal display could appear on a handheld, laptop, or other portable information device of an attendee.

Figure 5:
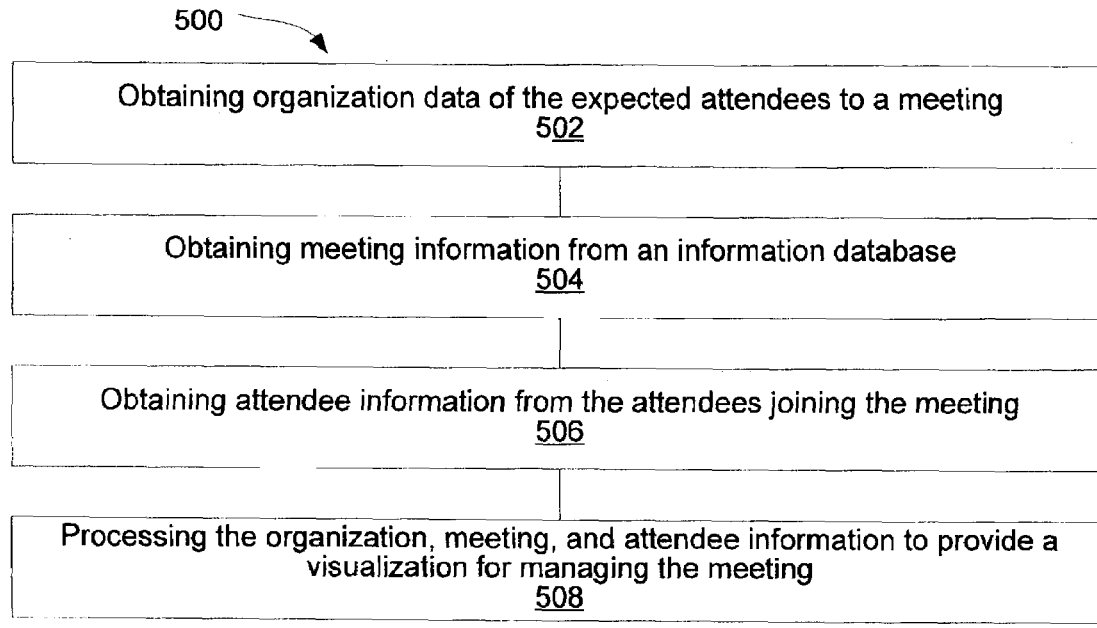
FIG. 5 a simplified flow chart of the organizational visualization system of FIG. 1 used as meeting manager.

Referring now to FIG. 5, therein is shown a simplified flow chart 500 of the organizational visualization system 100 of FIG. 1 used as meeting manager. The simplified flow chart 500 includes: a step 502 of obtaining organization information of the expected attendees to a meeting; a step 504 of obtaining meeting information from an information database; a step 506 of obtaining attendee information from the attendees joining the meeting; and a step 508 of processing the organization, meeting, and attendee information to provide a visualization for managing the meeting.

Figure 6:
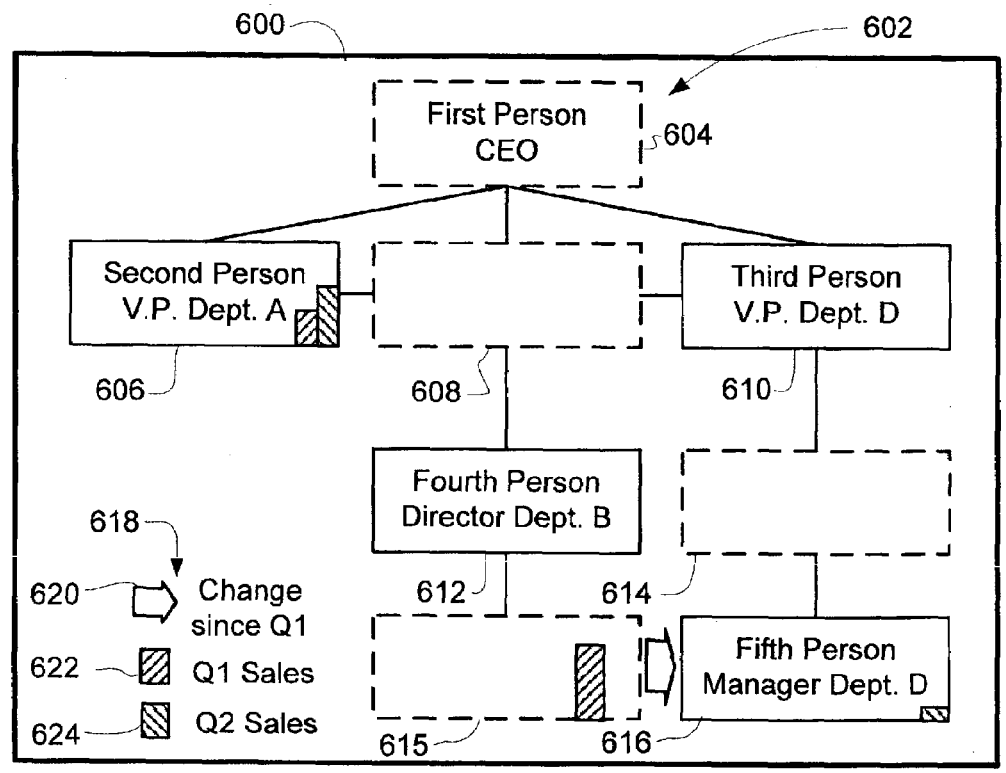
FIG. 6 is an exemplary sales display of the organizational visualization system of FIG. 1 used as a sales assistant.

Referring now to FIG. 6, therein is shown an exemplary sales display 600 of the organizational visualization system 100 of FIG. 1 used as a sales assistant.

Sales people need to understand the organization of their target client company to define the right audience and prepare their messages accordingly. In particular situations, such as in meetings or when answering the phone, the salesperson needs to know the structural function of the other person.

The present invention may allow a salesperson to acquire information in each meeting to construct the union of the information, and to determine the important positions in the target client company as well as the persons in these positions.

For example, an organization chart 602 includes a block 604 at a first level in the organization chart 602 to show a First Person, who is the Chief Executive Officer (CEO) of the organization. At a second level is shown a block 606 showing a Second Person, who is Vice President of Department A, a block 608 showing another vice presidential position of Department B, and a block 610 showing a Third Person, who is Vice President of Department B. A third level has a block 612 showing a Fourth Person who is Director of Department B, and a block 614 showing another director-level position of Department B. A fourth level of the organization chart 602 has a block 615 showing manager position of Department B and a block 616 showing a Fifth Person, who is Manager of Department D.

In the above example, sales information is dynamically constructed on the organization chart 602 by the processing module 106 of FIG. 1. By reference to a legend 618, it may be seen that an arrow such as an arrow 620 indicates a change since Q1, such as the Fifth Person formerly in the block 615 being moved to a new position in the block 616. A first crosshatched block 622 indicates Q1 and a second crosshatched block 624 indicates Q2 sales. The sales information would be overlay information for the organization chart 602.

The organization chart 602 provides a visualization of information in the organization chart 602 and the sales information to each department, such as the Q1 and Q2 sales to the Second Person in the block 606, the Q1 sales to the person who was in the block 615, and the Q2 sales to the Fifth Person in the block 616.

The active information allows the determination of the transfer of the Fifth Person, who was previously Manager of Department B to the person's current position as Manager of Department D as indicated by the dotted line of the block 615 and arrow to the block 616.

Other active information could be information such as: highlighting of those regions of the organization that have been recently contacted; highlighting those people who are responsible for higher purchases; etc. Using these organizational charts, a salesperson can see areas where untapped markets may lie. For example, since the Fifth Person in the block 616 is responsible for lesser sales, perhaps a better approach would be to contact the Fourth Person, who is Director of Department B as represented by the block 615.

The exemplary sales display 600 should be available to a salesperson on a private device and should appear automatically when needed. For example, using caller ID to show not only who is calling but also where the caller fits into their organization and the amount of sales the person has purchased in the past.

Figure 7:
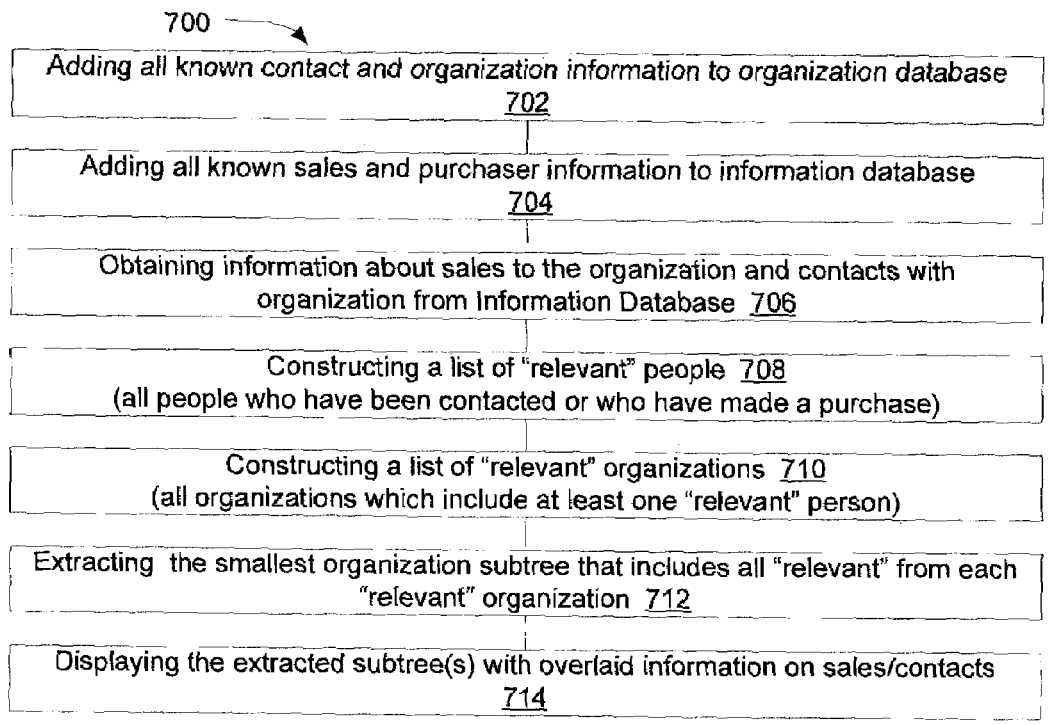
FIG. 7 is a flow chart of the organizational visualization system of FIG. 1 used as a sales assistant.

Referring now to FIG. 7, therein is shown a flow chart 700 of the organizational visualization system 100 of FIG. 1 used as a sales assistant.

The flow chart 700 includes: a step 702 of adding all known information to the organization database for each contact or purchaser; a step 704 of adding all known sales and purchaser information to the information database; a step 706 of obtaining information about sales to this organization and contacts with this organization from the information database; a step 708 of constructing a list of "relevant" people (all people who have been contacted or who have made a purchase); a step 710 of constructing a list of "relevant" organizations (all organizations which include at least one "relevant" person); a step 712 of extracting the smallest organizational subtree that includes all the "relevant" people from each "relevant" organization; and, a step 714 of displaying the extracted subtree(s) with overlaid information on sales/contacts.

The smallest organizational "subtree" from the organization database 102 of FIG. 1 provides an organization chart, which excludes executives higher up in the management who are not involved in purchasing decisions and focuses on the ones who are.

Figure 8:
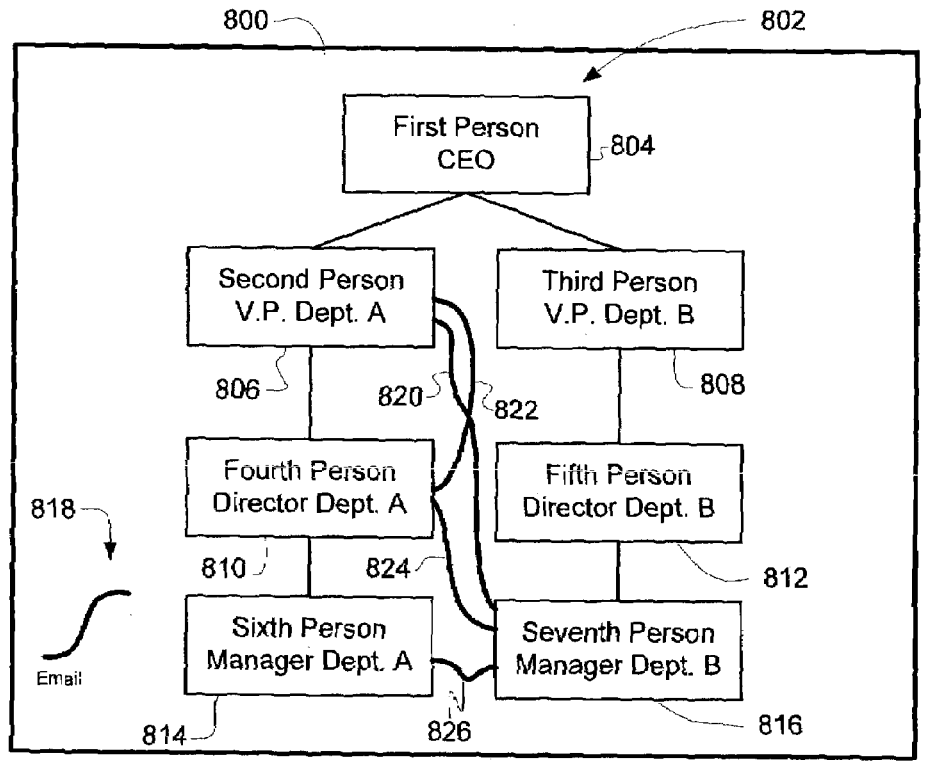
FIG. 8 is an exemplary technical collaboration display of the organizational visualization system of FIG. 1 used as a technical assistant.

Referring now to FIG. 8, therein is shown an exemplary technical collaboration display 800 of the organizational visualization system 100 of FIG. 1 used as a technical assistant.

In a collaborative scenario between two (or more) companies, and/or divisions, it is important to visualize the interaction to ensure the right relationships are occurring at the right levels. By utilizing the present invention, organizational charts may be constructed for each of the collaborating entities and then active information may be provided about communication between the collaborating entities as evidenced by: phone calls; meetings; e-mails; instant messages; etc.

In the exemplary technical collaboration display 800 is an organization chart 802. The organization chart 802 includes a block 804 at a first level to show a First Person, who is the CEO. At a second level, a block 806 shows a Second Person, who is a Vice President of Dept. A, and a block 808 shows a Third Person, who is a Vice President of Dept. B. At a third level, a block 810 shows a Fourth Person, who is a Director of Dept. A, and a block 812 shows a Fifth Person, who is a Director of Dept. B. At a fourth level, a block 814 shows a Sixth Person, who is a Manager of Dept. A, and a block 816 shows a Seventh Person, who is a Manager of Dept. B. A legend 818 indicates that a dark line represents e-mails between different individuals.

Using e-mails for tracking participation, it may be seen that a line 820 connects the Second Person of the block 806 with the Fourth Person in the block 810. A line 822 connects the Second Person in the block 806 to the Seventh Person in the block 816. A line 824 connects the Fourth Person in the block 810 with the Seventh Person in the block 816. Also, a line 826 connects the Sixth Person in the block 814 with the Seventh Person in the block 816.

By viewing the exemplary technical collaboration display 800, it may be seen that the people from Dept. A are participating but that only the Seventh Person in the block 816 is participating for Dept. B. This indicates that perhaps something is wrong. Perhaps Dept. A people did not take the project seriously, or perhaps the Second Person in the block 806 and the Fourth Person in the block 810 should be delegating more responsibility to the Sixth Person in the block 814.

As would be evident from the above disclosure it is possible to determine the target audience for a meeting and automatically compose the invitation list to the meeting making sure that the right people are in attendance. The present invention may later be exploited by meeting management agents when negotiating for dates of meetings and making sure that the meetings will be attended by the critical key people. The key people can sometimes be technical contributors in information meetings and sometimes decision makers for decision meetings. This allows mapping of attendance to different types of meetings.

Figure 9:
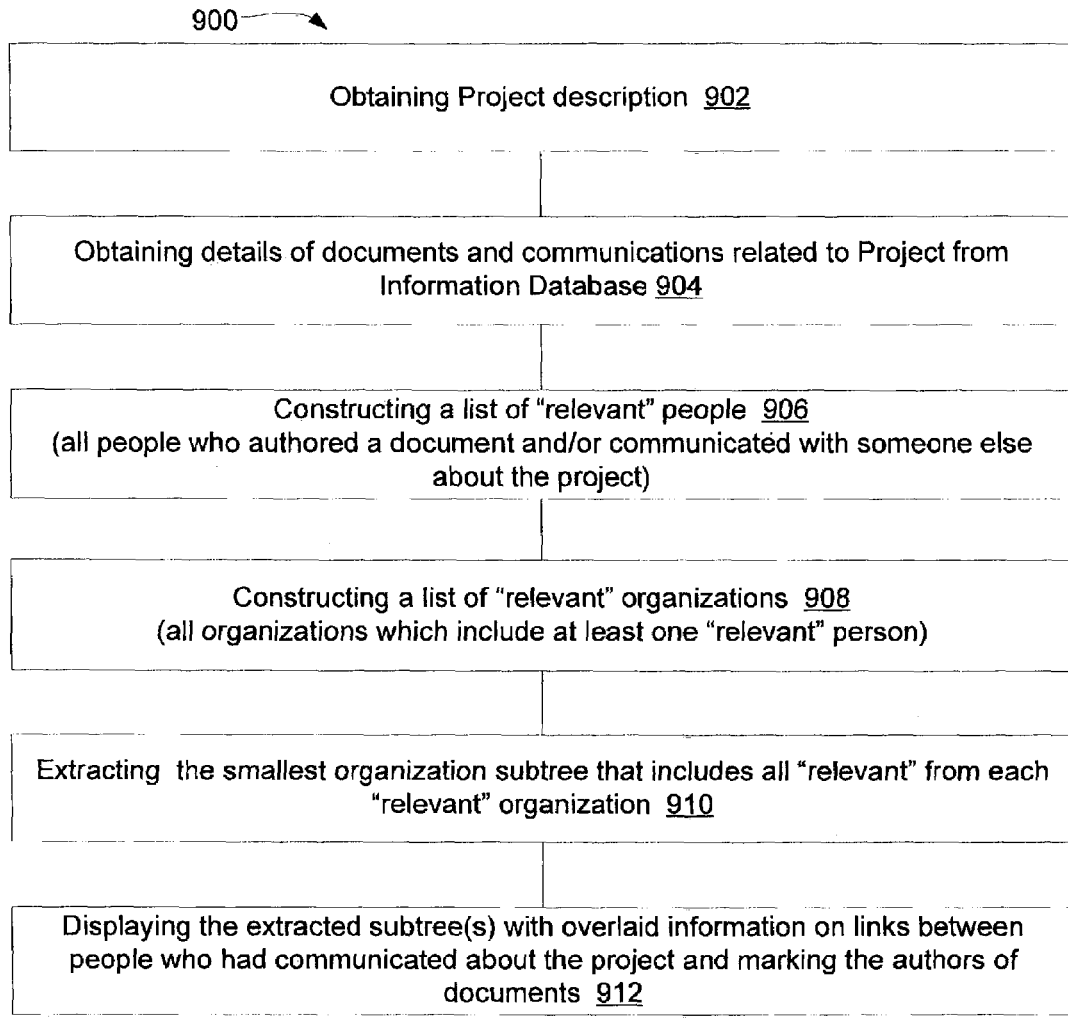
FIG. 9 is a flow chart of the organizational visualization system of FIG. 1 being used as a technical assistant.

Referring now to FIG. 9, therein is shown a flow chart 900 of the organizational visualization system 100 of FIG. 1 being used as a technical assistant. The flow chart 900 includes: a step 902 of obtaining a description of a project; a step 904 of obtaining details of documents and communication related to the project from the information database; a step 906 of constructing a list of "relevant" people (all people who authored a document and/or communicated with someone else about the project); a step 908 of constructing a list of "relevant" organizations (all organizations which include at least one "relevant" person); a step 910 of extracting the smallest organizational subtree that includes all the "relevant" people from each "relevant" organization; and a step 912 of displaying the extracted subtree(s) showing links between people who had communicated about the project and marking the authors of documents.

Since most meetings start with an ad hoc presentation of organization charts, the present invention may generate such charts automatically as people enter the room with devices that are tailored to operate in an active environment. Since the organizational chart may be dynamically generated, the content base can be altered based on the attendees; e.g., censoring portions of the organizational chart when people from outside the company are present.

Further the system may be used to create dynamically generated organizational charts as a way to visualize interactions between sales people and their customers, as well as interactions between departments and/or companies.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A method comprising:

adding organization information to an organizational database, wherein organization information includes hierarchy, names, and titles of members of an organization;

adding overlay information to an information database, wherein overlay information includes sales information and purchaser information;

constructing a list of relevant people from the overlay information, wherein relevant people include people who have been contacted or who have made a purchase;

constructing a list of relevant organizations from the organization information in the organizational database, wherein relevant organizations include at least one organization having a person from the constructed list of relevant people;

extracting an organizational subtree from the plurality of organizations that includes the relevant people from each relevant organization;

processing the organization information and the overlay information in a computer; and displaying the organizational subtree with the overlay information overlaid thereon.

2. The method of claim 1 additionally comprising:

obtaining active information;

and wherein:

the processing includes processing the organization information, the overlay information, and the active information to provide the visualization.

3. The method of claim 1 additionally comprising:

obtaining active information selected from a group consisting of meeting, sales, technical, collaboration, and project active information and a combination thereof.

4. The method of claim 1 additionally comprising:

obtaining overlay information selected from a group consisting of meeting, sales, technical, collaboration, and project specific information and a combination thereof.

* * * * *

UNITED STATES PATENT AND TRADEMARK OFFICE
CERTIFICATE OF CORRECTION

| | |
|---|---|
| PATENT NO. | : 7,350,144 B2 |
| APPLICATION NO. | : 10/418835 |
| DATED | : March 25, 2008 |
| INVENTOR(S) | : Bernard Joseph Burg et al. |

It is certified that error appears in the above-identified patent and that said Letters Patent is hereby corrected as shown below:

Title Page, Item (73), in "Assignee", in column 1, line 2, delete "Copmpany" and insert -- Company --, therefor.

In column 7, line 29, in Claim 1, after "wherein" insert -- the --.

Signed and Sealed this

Nineteenth Day of August, 2008

JON W. DUDAS
*Director of the United States Patent and Trademark Office*